(12) United States Patent
Haap et al.

(10) Patent No.: US 9,460,565 B2
(45) Date of Patent: Oct. 4, 2016

(54) SYSTEM FOR DIAGNOSING FAULTS OF A COMPONENT IN A VEHICLE

(75) Inventors: Thomas Haap, Moessingen (DE); Ralf Traub, Stuttgart (DE); Gerald Grau, Waiblingen (DE); Carsten Krebs, Herrenberg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/114,640

(22) PCT Filed: Dec. 16, 2011

(86) PCT No.: PCT/EP2011/006362
§ 371 (c)(1),
(2), (4) Date: Dec. 12, 2013

(87) PCT Pub. No.: WO2012/149951
PCT Pub. Date: Nov. 8, 2012

(65) Prior Publication Data
US 2014/0100737 A1    Apr. 10, 2014

(30) Foreign Application Priority Data

Apr. 30, 2011  (DE) .................. 10 2011 100 106

(51) Int. Cl.
*G07C 5/08*    (2006.01)
*G06F 11/22*   (2006.01)
*G07C 5/00*    (2006.01)

(52) U.S. Cl.
CPC .......... *G07C 5/008* (2013.01); *G06F 11/2294* (2013.01); *G07C 5/0808* (2013.01)

(58) Field of Classification Search
CPC .. G07C 5/008; G07C 5/0808; G06F 11/2294
See application file for complete search history.

(56) References Cited

U.S. PATENT DOCUMENTS

| | | | |
|---|---|---|---|
| 7,584,029 B2 | 9/2009 | Legate et al. | |
| 7,681,079 B2 * | 3/2010 | Xu et al. .......................... | 714/25 |
| 8,195,428 B2 * | 6/2012 | Kamdar et al. ............... | 702/183 |
| 8,554,896 B2 * | 10/2013 | Sodergren et al. ........... | 709/223 |
| 8,683,269 B2 * | 3/2014 | Jackson ................ | G06F 21/577 |
| | | | 714/25 |
| 8,918,245 B2 * | 12/2014 | Dewhurst et al. ........... | 701/31.5 |
| 9,317,307 B2 * | 4/2016 | Van Setten ......... | G06F 9/45508 |
| 2002/0103583 A1 | 8/2002 | Ohmura et al. | |
| 2003/0014505 A1 | 1/2003 | Ramberg et al. | |

(Continued)

FOREIGN PATENT DOCUMENTS

| | | |
|---|---|---|
| DE | 10 2008 052 955 A1 | 5/2010 |
| DE | 10 2008 063 276 A1 | 7/2010 |

(Continued)

OTHER PUBLICATIONS

International Search Report (PCT/ISA/210) with English translation dated May 10, 2012 (Five (5) pages).

(Continued)

*Primary Examiner* — Todd Melton
(74) *Attorney, Agent, or Firm* — Crowell & Moring LLP

(57) ABSTRACT

A system for the diagnosis of a component of a motor vehicle includes a sever configured to provide at least one test sequence for diagnosing the component and at least one execution parameter allocated to the test sequence. The system also includes a diagnostic device configured to receive at least one test sequence and the at least one execution parameter, and to convert it into a runtime script and execute the runtime script according to the execution parameters. A script generation device is configured to generate the test sequences as OTX script or as ETX script.

14 Claims, 1 Drawing Sheet

(56) References Cited

U.S. PATENT DOCUMENTS

| | | | |
|---|---|---|---|
| 2005/0034029 A1 | 2/2005 | Ramberg et al. | |
| 2005/0066231 A1 | 3/2005 | Szucs et al. | |
| 2005/0187680 A1 | 8/2005 | Kamdar et al. | |
| 2007/0294001 A1 | 12/2007 | Underdal et al. | |
| 2007/0299575 A1 | 12/2007 | Yamada et al. | |
| 2009/0199160 A1 | 8/2009 | Vaitheeswaran et al. | |
| 2010/0199080 A1* | 8/2010 | Kolb | 713/2 |
| 2011/0264844 A1 | 10/2011 | Fischer et al. | |
| 2012/0185126 A1* | 7/2012 | Wang et al. | 701/32.9 |

FOREIGN PATENT DOCUMENTS

| | | | |
|---|---|---|---|
| JP | 2002-228552 A | 8/2002 | |
| JP | 2002-331884 A | 11/2002 | |
| JP | 2003-19931 A | 1/2003 | |
| JP | 2005-122698 A | 5/2005 | |
| JP | 2008-1233 A | 1/2008 | |
| JP | 2008-135008 A | 6/2008 | |

OTHER PUBLICATIONS

German Written Opinion (PCT/ISA/237) dated May 10, 2012 (Eight (8) pages).

Japanese Office Action dated Nov. 18, 2014 with English translation (five pages).

English-language Chinese Office Action issued in Chinese counterpart application No. 201180070533.1 dated Feb. 1, 2016 (Eight (8) pages).

* cited by examiner

SYSTEM FOR DIAGNOSING FAULTS OF A COMPONENT IN A VEHICLE

BACKGROUND AND SUMMARY OF THE INVENTION

The invention relates to a system for the diagnosis of a component in a vehicle, in particular in a motor vehicle, as well as a method for the diagnosis of a component in a vehicle.

Modern motor vehicles are equipped with a plurality of electronic components. This increases the comfort and security of passengers and at the same time contributes to the reduction in emissions and fuel consumption. However, there is an increased risk of defective functioning of the electronic components. In order to be able to find and repair such defects, increasingly efficient electronic diagnostic methods are used, with which, for example, defect conditions in the motor vehicle can be detected. There exist various manufacturer-specific and independent diagnostic systems. Each of these possesses a user interface typically embodied in the form of a screen and a keypad. Both cable connections and wireless connections between the user interface and the motor vehicle diagnostic system are known. The wireless connection enables individual parameters of the engine, the gearbox or the add-on systems to be controlled even from a great distance, while the vehicle is being driven completely normally.

Modern diagnostic systems are configured to execute so-called scripts, in particular XML scripts. In this case, new scripts are transmitted partially wirelessly, for example via mobile telephony, to the diagnostic system located in the vehicle. The same applies for the changes to scripts that have already been stored, so for updates.

German patent document DE 10 2008 063 276 disclose a system enabling an exchange of software components in a running system, wherein the permissibility of the update is monitored by a previous autonomous verification. To that end, a distributed analysis is used, which investigates the performance to be expected with the aid of a local evaluator.

The transmission of XML scripts is disadvantageous because a relatively large amount of data must be transmitted. This is particularly disadvantageous during mobile telephony transmission, since the transmission of large amounts of data on the one hand causes high costs and on the other hand takes a relatively long time.

Accordingly, exemplary embodiments of the present invention provide a system and a method for the diagnosis of a component in a vehicle, which enables the transmission of a script, which, with the same informational content, has a considerably reduced amount of data compared to the XML script.

In accordance with exemplary embodiments of the present invention, a system for the diagnosis of a component of a vehicle, in particular a motor vehicle, provides a server that is configured and provided for the provision of at least one test sequence that is independent of the platform and that can be executed outside the diagnostic device, which sequence is for the diagnosis of the component, and at least one execution parameter allocated to the test sequence, as well as a diagnostic device that is configured and provided for the reception of at least one executable test sequence and the at least one execution parameter and for the conversion to a file format or runtime script that is executable or implementable in the environment of the diagnostic device and the runtime thereof, with a script interpreter or a script compiler.

The executable test sequences can be pre-compiled as ETX scripts (Executable Test Sequence Exchange) and are then particularly suitable for data transmission via telediagnostic connections as a result of their reduced file sizes compared to the source files. This is a decisive advantage in mobile telephony transmission.

A division into test sequences and execution parameters to keep the execution parameters separate from the test sequences for the transmission and to render them able to be transmitted separately enables the test sequences to be pre-executed in the diagnostic device and the execution parameters to be transmitted only when required by telematics, in particular by remote access to the diagnostic device, where then the script interpreter or script compiler produces the executable runtime script from the test sequences and the execution parameters.

If the diagnostic device is integrated in a telematics platform in the vehicle, the amount of data to be transmitted via a telematics connection can be considerably reduced. Only individual execution parameters such as times, trigger events, validity information, priorities etc. must be transmitted. Alternatively, the diagnostic device can also be implemented into a mobile test device, which is used in a workshop for vehicle diagnostics and can be applied to the vehicle.

A script generation device is preferably provided, which is configured to generate test sequences from an output script compiled in a script language, in particular in Open Test sequence data eXchange (OTX). However, any other language, in particular an XML language, can also be used, which fulfils the requirements of a language for describing a vehicle diagnosis. The server can advantageously be embodied only as software or as a computer on which server software runs.

In a further advantageous embodiment, the script generation device has a script input device designed for the compilation of the output script. Preferably, the script input device is embodied as a graphics editor. However, the use of any other suitable tool is also conceivable for software development.

It is even more advantageous for the script generation device to be configured to be used for the generation of the test sequence information from a database. This is preferably information present in a description language, in particular in ODX. ODX (Open Diagnostic Data Exchange) provides fundamental information (specification and documentation) for software configuration that is relevant for diagnostics in vehicles or control devices. It is standardised in the international standard ISO 22901-1.

The pre-compiled test sequences are preferably a combination of OTX scripts and ODX control device diagnostic data, wherein the diagnostic possibilities of control devices are described in ODX. The pre-compiled test sequences are preferably denoted with the file extension "ETX" (for Executable Test sequence exchange). These test sequences preferably contain all necessary information to be able to execute them independent of their platform. The test sequences are preferably converted to formats consisting of reduced-sized and platform-optimised runtime scripts (e.g. LUA, Java, Python, Pearl etc.) in a diagnostic unit in the vehicle or in a testing unit.

Moreover, the present invention involves a transmission device designed for transmitting the test sequences or pre-compiled test sequences from the script generation device to the server. To that end, a transmission interface and a corresponding receiving interface are advantageously provided, wherein the transmission interface is connected to the script generation device and the receiving interface is connected to the server, and the transmission interface is configured in such a way that it can transmit data and the receiving interface is configured in such a way that it can receive data transmitted by the transmission interface. The wireless transmission of data can thus take place both in analog and digitally (in parallel or series).

Furthermore, the transmission of the communication between the transmission interface and the receiving interface is preferably encrypted by the transmission interface and the receiving interface, each having means for encrypting and/or decrypting the data. As well as the wireless transmission of data (e.g. radio transmission, infrared communication), a glass fiber or another medium is fundamentally also conceivable. All common encryption methods are suitable for encrypting the data.

In another advantageous embodiment, an allocation device is provided, which is designed to allocate the at least one execution parameter to the test sequences or the pre-compiled test sequences in the form of ETX scripts. During the test sequences, the execution parameters preferably define the performance during the script execution, e.g. vehicle data to be compiled, the calculations and evaluations thereof and defining the further course of the script depending on the results, preferably under which conditions the runtime scripts are executed. This can, for example, take place by temporal triggering or after specific events in the vehicle. These execution parameters are advantageously separated from the script in order to enable vehicle-specific or fleet-specific script execution regulation.

The diagnostic device preferably has a script execution device, which is provided and configured for converting the test sequences or the pre-compiled test sequences into runtime scripts to be executed. Here, this can advantageously be a so-called "script interpreter", so a computer program that reads, analyzes and executes a program source code. The analysis of the source code thus takes place during the runtime of the program. However, any other device that is executable on any computer architecture is also conceivable. Naturally, a device could also be interposed, which functions as an assembler or compiler and which converts the file that is directly executable on the system. The script execution device takes on the conversion on the respective platform.

It is even more advantageous if the diagnostic device has an execution control device, which is provided and configured for evaluating the execution parameter allocated to the runtime script and for controlling the execution of the runtime script accordingly. Here, this can advantageously be a so-called "execution scheduler", so a control program that controls the execution sequence of the runtime scripts. To that end the execution control device advantageously evaluates the execution parameters and controls the script execution device according to the information contained therein.

The server and the diagnostic device are connected to each other via a communication means. This is preferably a network connection, in particular the internet. Advantageously, a transmission interface and a corresponding receiving interface are thus provided, wherein the transmission interface is connected to the server and the receiving interface is connected to the diagnostic device, and the transmission interface is configured in such a way that it can transmit data and the receiving interface is configured in such a way that it can receive information transmitted by the transmission interface. The transmission of data can thus in turn take place both in analog and digitally (in parallel or series).

Furthermore, the transmission of the communication between the transmission interface and the receiving interface is preferably encrypted by the transmission interface and the receiving interface each having means for encrypting and/or decrypting the data. As well as the wireless transmission of data (e.g. radio transmission, infrared communication), a glass fiber or another medium is fundamentally also conceivable. All common encryption methods are suitable for encrypting the data.

The communication means is preferably a mobile telephony connection. Here, the GSM standard, in particular the "short message service" (SMS) telecommunications service, is used. However, any other suitable mobile telephony connection, e.g. UMTS, is also conceivable. In the USA, communication means in line with the CDMA standard (the US equivalent of GSM) can be used. As well as SMS messages, the GPRS data package-orientated formats or 1XRTT, as well as future UMTS or HSxPA, LTE etc., are used in the USA for larger amounts of data.

A further advantageous embodiment of the invention involves a method for the diagnosis of a component in a vehicle in which a test sequence or pre-compiled test sequence is produced by means of a script input device, the test sequence or pre-compiled test sequence is transmitted to the server by a transmission device, the test sequence or the pre-compiled test sequence has an execution parameter allocated to it by an allocation device, the test sequence or pre-compiled test sequence and the execution parameter are received by a server through a diagnostic device and the diagnostic device generates the runtime script and executes the execution parameter accordingly.

Preferably, the script input device is embodied in this instance as a graphics editor. However, the use of any other suitable tool is also conceivable for software development. It is even more advantageous to use information from a database for the generation of pre-compiled test sequences in the form of ETX scripts. This is preferably information that is present in a description language, in particular in ODX. ODX (Open Diagnostic Data Exchange) provides fundamental information (specification and documentation) for software configuration that is relevant for diagnostics in vehicles or control devices. It is standardised in the international standard ISO 22901-1. The ETX scripts are preferably a combination of OTX scripts and ODX control device diagnostic data, wherein the diagnostic options of control devices are described in ODX. There is also an outline for an ISO standard (ISO 13209) for the OTX script language. The ETX scripts are preferably denoted with the file extension "ETX" (for Executable Test sequence exchange). The OTX or ETX scripts preferably contain all necessary information so as to be able to execute them independent of their platform in a development environment. After transmission to the diagnostic unit, the OTX or ETX scripts are preferably converted to formats consisting of reduced-sized and platform-optimised runtime scripts (e.g. LUA, Java, Python, Pearl etc.) A transmission interface and a corresponding receiving interface are advantageously provided for the transmission of the scripts to the server, wherein the transmission interface is connected to the script generation device and the receiving interface is connected to the server, and the transmission interface is configured in such a way that it can transmit data and the receiving interface is configured in such a way that it can receive data transmitted by the transmission interface. The transmission of data can thus take place both in analog and digitally (in parallel or series). Furthermore, the transmission of the communication between the transmission interface and the receiving interface is preferably encrypted by the transmission interface and the receiving interface each having means for encrypting and/or decrypting the data. As well as the wireless transmission of data (e.g. radio transmission, infrared communication), a glass fiber or another medium is fundamentally also conceivable. All common encryption methods are suitable for encrypting the data. During the test sequences, the execution parameters preferably define the performance during the script execution, e.g. vehicle data to be compiled, the calculations and evaluations thereof and defining the further course of the script depending on the results, preferably under which conditions the runtime scripts are executed. This can, for example, take place by temporal triggering or after specific events in the vehicle. These execution parameters are advantageously separated from the script in order to enable vehicle-specific or fleet-specific script execution regulation.

The diagnostic device preferably has a script execution device and an execution control device for executing the runtime script. The script execution device can advantageously be a so-called "script interpreter", so a computer program that reads, analyzes and executes a program source code. The analysis of the source code preferably takes place during the running time of the program. However, another device that is executable on any computer architecture is also conceivable. Naturally, a further device could also be arranged, which functions as an assembler or compiler and which converts the script that is directly executable on the system. The execution control device can advantageously be a so-called "execution scheduler", so a control program that controls the execution sequence of the runtime scripts. To that end the execution parameters are evaluated and the script execution device is controlled according to the information contained therein. The server and the diagnostic device are also preferably connected to each other via a communication means. This is preferably a network connection, in particular the internet. The data is advantageously transmitted by a transmission interface connected to the server and received by a corresponding receiving interface connected to the diagnostic device. The data can thus in turn be transmitted both in analog and digitally (in parallel or series). Furthermore, the transmission of the communication between the transmission interface and the receiving interface is preferably encrypted. The data can advantageously be transmitted wirelessly (e.g. by radio or infrared) or by glass fibers or another medium. All common encryption methods are suitable for encrypting the data. The test sequences or the ETX scripts and the execution parameter are preferably transmitted via a mobile telephony connection. Here, the GSM standard, in particular the "short message service" (SMS) telecommunications service, is used. However, any other suitable mobile telephony connection, e.g. data packaging services such as GPRS, 1XRTT, HSxPA or UMTS, is also conceivable.

The following advantages are produced with the invention:

The amount of data to be transmitted is considerably reduced compared to known XML scripts. This is crucial for mobile telephony transmission.

The OTX and ETX scripts can be designed to be independent of their platform on the offboard side. The conversion to the onboard platform in the vehicle or in the test device is carried out by the script compiler or script interpreter.

Specially designed diagnostic tasks can be transmitted at any time by remote access to the telematics platforms in vehicles or to the test devices.

To change the execution rules for the test sequences, the execution parameters only have to be updated by remote access. The actual test sequences can remain unchanged on the telematics platform. This enables a substantial reduction in the amount of data to be transmitted, which is in turn crucial during mobile telephony transmission.

Authorized and unauthorized diagnostic services or CAN BUS services can be defined in the firewall in the vehicle, and thus an interference or manipulation of the vehicle can be prevented. The adjustments to the firewall can in turn be made on the basis of new business models.

BRIEF DESCRIPTION OF THE DRAWINGS

The invention is illustrated in greater detail below with the aid of figures. Here are shown.

DETAILED DESCRIPTION

Figure 1:
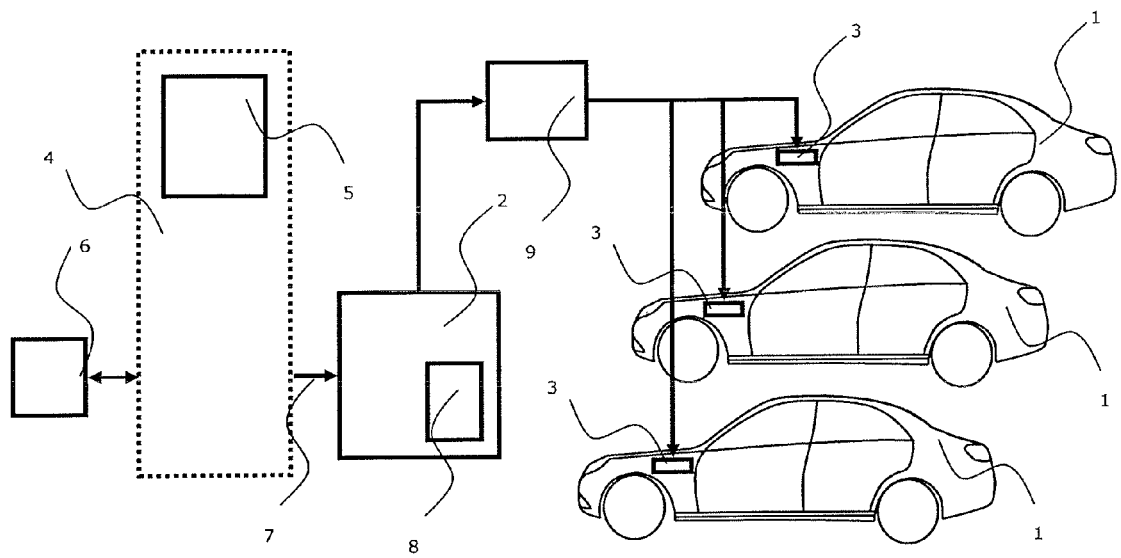
FIG. 1 the schematic overview of a preferred embodiment of the system.

A preferred embodiment of a system according to the invention is depicted schematically in FIG. 1, the central components of which are motor vehicles 1, a server 2, diagnostic devices 3, a script generation device 4, a script input device 5, a database 6, a transmission device 7, an allocation device 8 and a communication means 9.

The script input device 5 is depicted here as a component of the script generation device 4. However, it is also possible for the script input device 5 and script generation device 4 to be separate devices. The script generation device 4 is connected to the database 6 and the server 2. This can be an electrical or even a wireless or other type of connection. The allocation device 8 is depicted here as a component of the server 2. Naturally, it is, however, also possible for the allocation device 8 to be arranged outside the server 2. Then the allocation device 8 would, however, have to be connected to both the script generation device 4 and the server. These connections could also be electrical, wireless or other connections. The server 2 is connected to the diagnostic devices arranged in the vehicles 1 via the communication means 9. This connection can in turn be embodied as an electrical, wireless or other connection.

Preferably, the script input device 5 is embodied as a graphics editor. It is even more advantageous if information from a database 6 is used for the generation of the test sequences or the pre-compiled test sequences 21. Here, a database 6 is presently understood to be a so-called database system, which consists of a database management system and the data that is to be processed. This data is preferably information that is present in a description language, in particular in ODX. A platform-independent script is produced by the script generation device 4 from the output script compiled with the aid of the script input device 5. This script is preferably a combination of an OTX script and ODX control device diagnostic data. These test sequences or pre-compiled test sequences are then transmitted to the server 2 depending on the embodiment 21. The transmission of data can thus take place both in analog and digitally (in parallel or series). As well as the wireless transmission of data (e.g. radio transmission, infrared communication), a glass fiber or another medium are fundamentally also conceivable. At least one execution parameter is then allocated to the test sequences or pre-compiled test sequences 21 by the allocation device 8. This preferably determines the conditions under which the respective test sequences are to be executed by the diagnostic devices 3. The execution parameters are advantageously separated from the script in order to enable vehicle-specific or fleet-specific script execution regulation.

Test sequences can be allocated to one or several vehicles by the allocation device. Allocation to a single fleet of vehicles or to several fleets of vehicles is also possible. The allocation takes place, for example, with the aid of an identifier. Likewise, depending on the target vehicle(s) or target fleet(s), different execution parameters can be allocated to the final runtime scripts by the allocation device.

The definition and selection of the respective vehicles or fleets takes place by control logic in the server. The control logic obtains the selection criteria from a database (6), to as great an extent as possible with a manual input/output interface. The configuration status of the vehicles is documented in the database and the test sequences and execution parameters that are necessary for the respective configuration status are provided and processed.

To execute the test sequences or the pre-compiled test sequences, the diagnostic device preferably has a script execution device 22 and an execution control device 23. The script execution device 22 can advantageously be a so-called "script interpreter", so a computer program that reads, analyzes and executes a program source code. The execution control device 23 can advantageously be a so-called "execution scheduler", so a control program that controls the execution sequence of the runtime scripts. The communication means 9 is preferably a network connection, in particular the internet. Test sequences or pre-compiled test sequences 21 and the at least one execution parameter are preferably transmitted to the diagnostic devices 3 via a mobile telephony connection.

Figure 2:
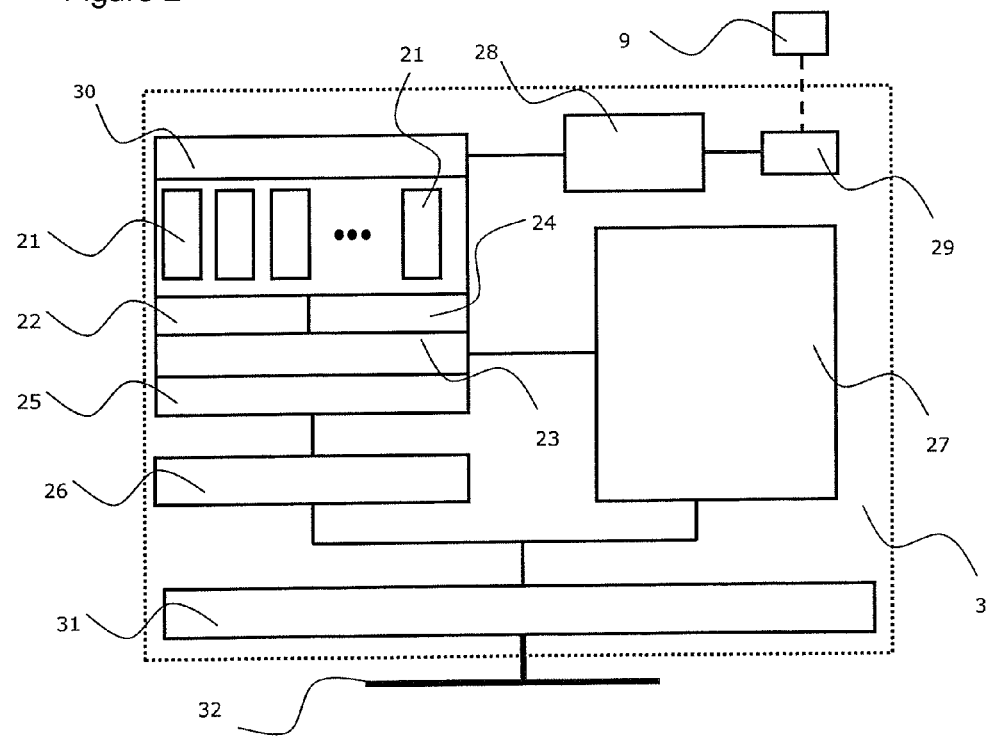
FIG. 2 the schematic depiction of an exemplary diagnostic device

An example for a diagnostic device 3 is schematically depicted in FIG. 2, the central components of which are a row of test sequences or ETX scripts 21, a script execution device 22, an execution control device 23, a programmer interface 24, a runtime environment 25, a firewall 26, a further application 27, a connection control device 28, a network adapter 29, a transmission control unit 30, a CAN driver 31, a CAN bus 32 and a communication means 9.

The diagnostic device 3 is connected to the sensors via the CAN bus 32. Instead of a CAN bus 32, another suitable bus system can also be used.

The runtime environment 25 is executed together with the runtime script, which cannot communicate directly with the operating system, and makes the script executable by mediating between runtime script and operating system.

After a test sequence or a pre-compiled test sequence 21 has been received via the communication means 9 and the network adapter 29, it is executed by the script execution device 22. Specifically, the script is first saved so that it can be executed at later points in time. Alternatively, an immediate or prompt execution can take place. The script execution device 22 can advantageously be a so-called "script interpreter", so a computer program that reads, analyzes and executes a program source code. The script execution device is preferably a script compiler, which converts the OTX test sequences or the ETX scripts into the diagnostic target format, e.g. LUA, Java, Python, Pearl etc., which is applied in the respective vehicle.

The execution control device 23 can advantageously be a so-called "execution scheduler", so a control program that controls the execution sequence of the runtime scripts. To that end the execution parameters are evaluated and the script execution device 22 is controlled according to the information contained therein. The execution parameters are not depicted here.

The control of the script execution device 22 is necessary, since, for example, a real control device to be diagnosed can contain additional virtual control devices. These can be diagnosed among themselves and, not unproblematically, simultaneously with the real control device. A detection of the related real and virtual control devices is, for example, not possible with ODX. In order to eliminate interferences between two script executions, the diagnostic device 3 should preferably only execute one runtime script at a time. This is particularly relevant if two runtime scripts access the same (real or virtual) control devices. Different priorities are allocated to the individual runtime scripts by the respective execution parameters. The execution control device 23 ensures the sequential execution of the runtime scripts based on their execution priority.

It should be noted here that there are also transmission parameters as well as execution parameters regulating the conditions for the transmission of the script execution results and the transmission conditions of the runtime scripts. In the same way as the execution scheduler, a transmission scheduler is provided for the transmission of the script execution results, which controls the transmission of the results to the server.

Authorized and unauthorized diagnostic services or CAN bus 32 services can be defined in the firewall 26. Since the firewall 26 cannot be influenced remotely, only approved diagnostic services can be permitted for diagnostic providers.

The transmission of the script execution results also takes place sequentially, since only one communications means 9, and thus only one data channel, is available (e.g. the mobile telephony channel). The transmission control 30 ensures the prioritized transmission of the results. Beyond that, the transmission of the script execution results from the diagnostic device to a server takes place in encrypted form, preferably via a mobile telephony connection, and takes place in the same way as the transmission of the execution parameters.

In addition to the local (i.e. located on the diagnostic unit) regulations for script execution and results transmission (based on the execution and transmission parameters), it is also possible for script execution and/or results transmission requests to be sent from the server to a diagnostic unit via a suitable input unit on the server. These requests can be sent to a single vehicle or a selection (fleet) of vehicles (for this, an allocation device (8) can be used). Again, a wireless or mobile telephony connection and, if necessary (but not mandatorily), an encryption is used. After the receipt of such a request from the server, the script execution is ensured on the diagnostic device by the execution scheduler with a predetermined priority. The results transmission is also ensured by the transmission scheduler with a predetermined priority.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for the diagnosis of a component of a motor vehicle, the system comprising:
   a server configured to separately transmit
   at least one test sequence for diagnosing the component, and
   at least one execution parameter allocated to the test sequence,
   wherein the at least one execution parameter defines a performance during the test sequence,
   a diagnostic device configured to
   receive and pre-execute the at least one test sequence,
   receive the at least one execution parameter separately from and subsequent to the receipt of the at least one test sequence, and
   execute, using a script execution device, the received at least one test sequence according to the execution parameter.

2. The system according to claim 1, further comprising:
   a script generation device having a script input device, which is configured to compile a platform-independent output script.

3. The system according to claim 1, wherein the server and the diagnostic device are connected to each other via a communication means.

4. The system according to claim 3, wherein the communication means is a mobile telephony connection, a satellite connection, or another wireless communication connection.

5. The system according to claim 1, wherein the diagnostic device is part of a telematics platform in a vehicle or in a mobile testing device.

6. The system according to claim 1, wherein the at least one test sequence is a pre-compiled test sequence.

7. The system according to claim 6, wherein the at least one test sequence is Open Test sequence data eXchange (OTX) scripts and the pre-compiled test sequence is executable test sequence exchange scripts.

8. The system according to claim 6, further comprising:
   an allocation device configured to allocate the at least one execution parameter to the at least one test sequence or the pre-compiled test sequence.

9. The system according to claim 6, wherein the at least one test sequence is at least one platform-independent test sequence, the pre-complied test sequence is a platform-independent, pre-complied test sequence, the diagnostic device includes a script execution device configured as a script interpreter or a script compiler, wherein the script execution device is configured to generate a platform-adapted runtime script from the at least one platform-independent test sequence, or the platform-independent, pre-compiled test sequence.

10. The system according to claim 9, wherein the diagnostic device includes an execution control device configured to evaluate the execution parameter allocated to the platform-adapted runtime script and to control the execution of the runtime script based on the execution parameter.

11. The system according to claim 1, wherein the diagnostic device is part of a vehicle and the server is external to the vehicle.

12. A method for the diagnosis of a component of a vehicle, the method comprising:
   compiling, by a script input device, a platform-independent test sequence;
   transmitting, by a transmission device to a server, the platform-independent test sequence;
   allocating, by an allocation device, at least one execution parameter to the platform-independent test sequence, wherein the at least one execution parameter defines a performance during the platform-independent test sequence;
   receiving and pre-executing, by a diagnostic device from the server, the platform-independent test sequence;
   receiving, by the diagnostic device, the execution parameter separately from and subsequent to the receipt of the platform-independent test sequence; and
   executing, by the diagnostic device, the platform-independent test sequence according to the execution parameter.

13. The method according to claim 12, wherein the test sequence is pre-complied by a script generation device.

14. The method according to claim 13, further comprising:
   transmitting execution results of a script to the server after execution of the platform-independent test sequence.

* * * * *